United States Patent [19]

Margolis et al.

[11] 4,251,559

[45] Feb. 17, 1981

[54] DECAFFEINATION PROCESS

[75] Inventors: Geoffrey Margolis, Bussigny; Jacky Chiovini, Daillens, both of Switzerland

[73] Assignee: Societe d'Assistance Technique pour Produits Nestle S.A., Lausanne, Switzerland

[21] Appl. No.: 957,822

[22] Filed: Nov. 6, 1978

[51] Int. Cl.³ ............................................... A23F 5/22
[52] U.S. Cl. ..................................... 426/490; 426/427
[58] Field of Search ....................... 426/427, 428, 490

[56] References Cited

FOREIGN PATENT DOCUMENTS 2005293 11/1972 Fed. Rep. of Germany ........... 426/427
2638383 3/1977 Fed. Rep. of Germany ........... 426/427

*Primary Examiner*—Joseph M. Golian
*Attorney, Agent, or Firm*—Watson, Leavenworth, Kelton & Taggart

[57] ABSTRACT

Caffeine is extracted from solutions thereof with supercritical carbon dioxide having a density of at least 0.85 g/ml.

8 Claims, No Drawings

DECAFFEINATION PROCESS

This invention is concerned with the extraction of caffeine from solutions, in particular from aqueous extracts of vegetable materials such as tea and coffee.

German Patent Application No. 2638383 describes a coffee decaffeination process in which the caffeine in the coffee is taken up into aqueous solution and subsequently recovered therefrom with supercritical carbon dioxide. The term "supercritical" as used herein denotes that the temperature is above the critical temperature of 31.3° C. and the pressure is above the critical pressure of 73.8 bar.

The starting material in the decaffeination process of German Patent Application No. 2638383 may be either green or roasted coffee and it is proposed to re-extract the caffeine from the carbon dioxide. The operating temperatures and pressures are given in the German Patent Application No. 2638383, respectively, as 31° to 95° C. and 75 to 400 bar.

It has now been found that the efficiency of extraction of caffeine from solutions, particularly aqueous solutions, using supercritical carbon dioxide is substantially increased if the supercritical carbon dioxide has a density of at least 0.85 g/ml.

The present invention thus provides a process for the extraction of caffeine from a caffeine solution which comprises contacting the solution with supercritical carbon dioxide having a density of at least 0.85 g/ml and separating caffeine-laden carbon dioxide from solution of reduced caffeine content. The term "reduced content" in the present context is intended to cover zero content.

Most frequently, the caffeine will be in aqueous solution such as an extract of tea or of green or roasted coffee. Such solutions may have a total solids content of 1 to 60% by weight and a caffeine content of 0.01 to 3.5% by weight.

Preferably, the carbon dioxide has a density of at least 0.90 g/ml and most desirably at least 0.95 g/ml. The density of carbon dioxide is dependent on the temperature and the pressure. The minimum density of 0.85 g/ml may be obtained at about 80° C. and 450 bar. In practice, the operating temperature and pressure will be selected having regard to the nature of the caffeine solution being extracted. Thus, for example, in the case of coffee or tea extracts the temperature will be related to their solids contents as they directly affect their viscosity and, moreover, high temperatures are detrimental to quality. Extracts of roasted coffee containing up to about 30% solids by weight may thus be decaffeinated at temperatures as low as 32° C., whereas temperatures of 50° C. may be required for efficient decaffeination of concentrated extracts having solids contents of at least 40% by weight). Tea extracts are preferably decaffeinated at 60° to 70° C. in order to eliminate the risk of tannin precipitation which may occur at lower temperatures. Aromatics are preferably stripped from tea or roasted coffee extracts prior to contacting.

Another important factor to be taken into consideration is the weight ratio of carbon dioxide to caffeine solution, and this will be selected having regard to the degree of decaffeination desired. More specifically, lower carbon dioxide to solution ratios may be used with increasing density of the carbon dioxide. Thus, for coffee and tea extracts ratios as low as about 8 to 1 have given satisfactory results.

The contacting may be effected in a packed column or other piece of equipment providing for intimate fluid contact and separation of two phases. Extraction is most conveniently carried out in a closed system, in which provision is made for extraction of the caffeine taken up by the carbon dioxide prior to its being recycled. The caffeine may be extracted from the carbon dioxide phase with active carbon or water. Particularly preferred is extraction with water by the process described in our copending application of even date herewith, entitled "Caffeine extraction".

The invention is illustrated by the following Examples, in which all ratios, parts and percentages are given on a weight basis.

EXAMPLE 1

A roasted coffee extract containing 9% solids is extracted in a closed system with supercritical carbon dioxide having a density of 0.86 g/ml. Contacting is effected in a batch system, at a pressure of 450 bar and a temperature of 80° C. At a carbon dioxide/extract ratio of 20 to 1, 62% of the caffeine has been extracted. The experiment is repeated at the same ratio but the pressure and temperature are changed to raise the carbon dioxide density to 0.95 g/ml. A 71% degree of decaffeination is obtained.

For comparison purposes, the experiment is repeated with carbon dioxide having a density of 0.75 g/ml. The degree of decaffeination is 44%.

EXAMPLE 2

A roasted coffee extract containing 9% solids is extracted in a closed system with supercritical carbon dioxide having a density of 0.86 g/ml. Contacting is effected in a packed column, at a pressure of 450 bar and a temperature of 80° C. With a carbon dioxide/extract ratio of 40 to 1, 93% of the caffeine are extracted. The carbon dioxide is continually recycled, the caffeine being first removed by contacting with water. By adjusting the pressure and temperature, the density of the carbon dioxide is raised to 0.91 g/ml and 98% caffeine removal is obtained. Using carbon dioxide having a density of 0.95 g/ml, 99% decaffeination is achieved.

For comparison purposes, with carbon dioxide having a density of 0.82 g/ml the degree of decaffeination is 90%, whereas when the density is reduced to 0.71 g/ml (300 bar, 90° C.) the degree of decaffeination is decreased to 79%.

EXAMPLE 3

A continuous extraction process, comprising contacting in a column, phase separation, removal of caffeine from carbon dioxide with water and recycling of the caffeine-free carbon dioxide to the column, was used for the decaffeination of aqueous coffee and tea extracts. The density and carbon dioxide to extract ratio were the variables. The results are set out in the following Table. Comparative results outside the scope of the present invention are marked with an asterisk.

TABLE

| Extract (caffeine solution) | $CO_2$/extract ratio | Temp. (°C.) | Press. (bar) | $CO_2$ density (g/ml) | % decaf. |
|---|---|---|---|---|---|
| Green coffee, 10% solids | 50:1 | 70 | 250 | 0.75* | 79 |
| | 50:1 | 80 | 450 | 0.86 | 98 |
| | 20:1 | 70 | 250 | 0.75* | 42 |
| | 20:1 | 80 | 450 | 0.86 | 85 |
| | 20:1 | 70 | 600 | 0.95 | 96 |

TABLE-continued

| Extract (caffeine solution) | CO$_2$/extract ratio | Temp. (°C.) | Press. (bar) | CO$_2$ density (g/ml) | % decaf. |
|---|---|---|---|---|---|
| | 10:1 | 70 | 250 | 0.75* | 18 |
| | 10:1 | 70 | 300 | 8.80* | 22 |
| | 10:1 | 70 | 600 | 0.95 | 82 |
| Roasted coffee, 55–60% solids | 45:1 | 90 | 300 | 0.71* | 79 |
| | 45:1 | 80 | 450 | 0.86 | 93 |
| | 45:1 | 70 | 600 | 0.95 | 99 |
| | 40:1 | 70 | 250 | 0.75* | 81 |
| | 40:1 | 70 | 600 | 0.95 | 98 |
| | 30:1 | 91 | 450 | 0.82* | 80 |
| | 30:1 | 80 | 450 | 0.86 | 85 |
| | 30:1 | 86 | 600 | 0.91 | 92 |
| | 30:1 | 70 | 600 | 0.95 | 97 |
| | 10:1 | 91 | 450 | 0.82* | 37 |
| | 10:1 | 70 | 600 | 0.95 | 71 |
| Tea extract 11.8% solids | 40:1 | 91 | 450 | 0.82* | 83 |
| | 40:1 | 80 | 450 | 0.86 | 96 |
| | 30:1 | 91 | 450 | 0.82* | 72 |
| | 30:1 | 70 | 600 | 0.95 | 98 |
| | 8:1 | 91 | 450 | 0.82* | 24 |
| | 8:1 | 70 | 650 | 0.96 | 97 |
| Caffeine solution 0.4% | 50:1 | 70 | 175 | 0.60* | 71 |
| | 50:1 | 92 | 500 | 0.85 | 96 |
| | 30:1 | 70 | 300 | 0.80* | 80 |
| | 30:1 | 92 | 500 | 0.85 | 89 |
| | 20:1 | 70 | 300 | 0.80* | 64 |
| | 20:1 | 70 | 500 | 0.91 | 90 |
| | 20:1 | 70 | 600 | 0.95 | 97 |

We claim:

1. A process for the extraction of caffeine from a caffeine solution which comprises contacting the solution with supercritical carbon dioxide having a density of at least 0.85 g/ml and separating caffeine-laden carbon dioxide from solution of reduced caffeine content.

2. A process according to claim 1 in which the caffeine solution is an extract of tea or of green or roasted coffee.

3. A process according to claim 1 in which the caffeine solution is an extract of roasted coffee containing up to 30% by weight solids and the contacting is effected at a temperature of at least 32° C.

4. A process according to claim 1 in which the caffeine solution is an extract of roasted coffee containing at least 40% by weight solids and the contacting is effected at a temperature of at least 50° C.

5. A process according to claim 3 or 4 in which a stripped extract is used.

6. A process according to claim 1, 2, 3 or 4 in which the weight ratio of carbon dioxide to caffeine solution is at least 8:1.

7. A process according to claim 6 in which the carbon dioxide has a density of at least 0.90 g/ml.

8. A process according to claim 7 in which the carbon dioxide has a density of at least 0.95 g/ml.

* * * * *

UNITED STATES PATENT AND TRADEMARK OFFICE
CERTIFICATE OF CORRECTION

PATENT NO. : 4,251,559

DATED : February 17, 1981

INVENTOR(S) : Geoffrey Margolis and Jacky Chiovini

It is certified that error appears in the above—identified patent and that said Letters Patent is hereby corrected as shown below:

At line 7 of the Table appearing in Col. 3 under the heading "$CO_2$ density" for green coffee, "8.80*" should read --0.80*--.

Signed and Sealed this

Second Day of March 1982

[SEAL]

Attest:

GERALD J. MOSSINGHOFF

Attesting Officer

Commissioner of Patents and Trademarks